July 28, 1970 SEIICHI KANEDA 3,521,888

CARTRIDGE HOLDER FOR TAPE PLAYER

Filed Jan. 4, 1968 5 Sheets-Sheet 1

INVENTOR.
SEIICHI KANEDA
BY
Linton and Linton
ATTORNEYS

INVENTOR.
SEIICHI KANEDA
BY
Linton and Linton
ATTORNEYS

CARTRIDGE HOLDER FOR TAPE PLAYER

INVENTOR.
SEIICHI KANEDA
BY
Linton and Linton
ATTORNEYS

July 28, 1970 SEIICHI KANEDA 3,521,888

CARTRIDGE HOLDER FOR TAPE PLAYER

Filed Jan. 4, 1968 5 Sheets-Sheet 4

INVENTOR.
SEIICHI KANEDA
BY
Linton and Linton
ATTORNEYS

INVENTOR.
SEIICHI KANEDA
BY
Linton and Linton
ATTORNEYS

United States Patent Office 3,521,888

Patented July 28, 1970

3,521,888
CARTRIDGE HOLDER FOR TAPE PLAYER

Seiichi Kaneda, Tokyo, Japan, assignor to Teikoku Dempa Co., Ltd., Tokyo, Japan

Filed Jan. 4, 1968, Ser. No. 695,593
Claims priority, application Japan, June 15, 1967, 42/50,674
Int. Cl. G11b *5/00*
U.S. Cl. 274—4 1 Claim

ABSTRACT OF THE DISCLOSURE

In the present tape player there is provided means for pressing on the inserted end of a cartridge inserted in said tape player, an opening in the base of the tape player for receiving a roller carried by said cartridge to correctly position said cartridge in the tape player and a resiliently held door normally closing the cartridge receiving opening of the tape player and pressing on the inserted end of the inserted cartridge to hold the cartridge fixedly within said tape player.

The present invention is related to a device of a cartridge holder for a tape player, in which the cartridge inserted can be effectively held so that sound recording and playing can be made without being troubled by the vibration thereof, and the like.

The tape players have been used heretofore in automobiles and other cars. Such tape players for automobiles, and the like are so designed to stand mechanically the vibrations of the automobiles, and the like and so that an electrical noise is caused in them by such vibrations, which is quite the same as in the case of a car radio set. However, since this tape player is fitted with the tape cartridge which is made separately, and if this tape cartridge is not perfect in stopping the vibrations, even when the tape player stands vibrations, the cross talk is caused between the neighboring tracks in the case of playing a tape recorded in multi-tracks, for instance, the tape recorded in 8 tracks. When 8 recording tracks are provided in the tape of about 6.25 mm. in width, the distance between the neighboring tracks will be as small as or less than 1 mm. Accordingly, even a slight vibration of the cartridge influences the tape to be fed, and consequently, the record in an adjacent track is mixed played as a noise. Prior tape players used for cars have caused such cross talks, and 8-track tape cartridge as mentioned above had been adapted for cars, but such an adoption of 8-track tape cartridge was abandoned on account of many defects such as cross talks, and thus a 4-track cartridge is considered to be adopted for such tape player for cars. However, even this 4-track tape in the cartridge causes unclear playing if not cross talk. In order to remove these defects, it is necessary to completely fix the inserted cartridge to the tape player, but on the other hand such a complete fixing of the cartridge results in the difficult insertion and removal of the cartridge thus the fixing of the position of the cartridge to be inserted and removed is very difficult in the same way as the fixing of the position of the tape to be fed is difficult.

The present invention aims to improve the above-mentioned defect. The fundamental purpose of the present invention is to effectively fix the tape cartridge to the tape player, and to make the insertion and removal of the cartridge easy and smooth with the least influence on the operation of the insertion and removal of the cartridge. For this purpose, in the present invention, the top surface of the inserted cartridge is pressed with rollers provided with elastic material near the head. Thereby the inserted cartridge, especially its portion near the head is fixed completely to the tape player. Such rollers keep a linear contact with the almost flat top surface of the cartridge and thus the pressure applied by the elastic materials acts concentrically with very strong pressing function and effectively prevents the relation position (height) of the tape in the cartridge to the head from being changed by vibrations, and the like of the cars, and the like. As the rollers are rotatable so that they can be moved conveniently in the inserting and removing of the cartridge without disturbing the operations of its insertion and removal in spite of the aforementioned strong pressing function of the rollers.

The end portion of the cartridge contacts the circumferences of the rollers, thereby smoothly pushing up the rollers against the elasticity of the elastic material to work on the top surface of the cartridge. Further, it exerts smooth rotation on the cartridge by pushing forward the cartridge as the rollers guide the insertion and removal of the cartridge. Thus the cartridge can be very smoothly inserted and removed. Another object of the present invention is to exactly retain the inserted cartridge at the inserting position to the head, for which the engaging roller is provided near the pressing position of said rollers at the time of insertion of the cartridge. The base plate of the tape player is formed with a hole for said fitting rollers at the inserting and removing of this cartridge. In this way the fitting roller on the bottom of the inserted cartridge is exactly fitted in the hole under the pressing function of the rollers from the upper surface of said cartridge. Thus the effective inserting position of the cartridge can be taken and kept relative to the head, the capstan or the detector and other parts arranged on the side of the tape player.

Further another object of the present invention is to more correctly hold the cartridge to the tape player by giving the suitable pressing to the upper surface of the cartridge not only on the head side but also on the inserting side. The inserted cartridge is pressed on the head side, thereby enabling it to fix the relative position (height) of the cartridge to the head, but in case of such pressure on only one side of the cartridge, the other side is raised up during vibrations of cars, and the like and consequently the relative position of the cartridge (the tape in it) and the head is indirectly changed. In the present invention, the suitable elastic pressure is given to such a cartridge on the inserting side of the tape player too, thereby effectively avoiding said raising state of the other end of the cartridge and the relative position of the inserted cartridge and the head is correctly fixed. Such an elastic pressure on the inserting side of the tape player may be of course lighter than the pressure on the head side. In the embodiment of the present invention the sufficient desired purpose was attained by adopting the pressure of the elastic material which acts so as to always return to the shut position of the door provided at the inserting opening. Such door always closes this inserting opening when the cartridge is inserted therein, thus it protects the tape player from dust, while this opening of the conventional tape player of this kind remains open. The closing of the opening gives a neat and beautiful tape player decorated with designs on the door located in the front of the tape player. Further many excellent characteristics and functional effects can be clearly understood with the following embodiment of the present invention.

In reference to the attached drawings.

Figure 1:
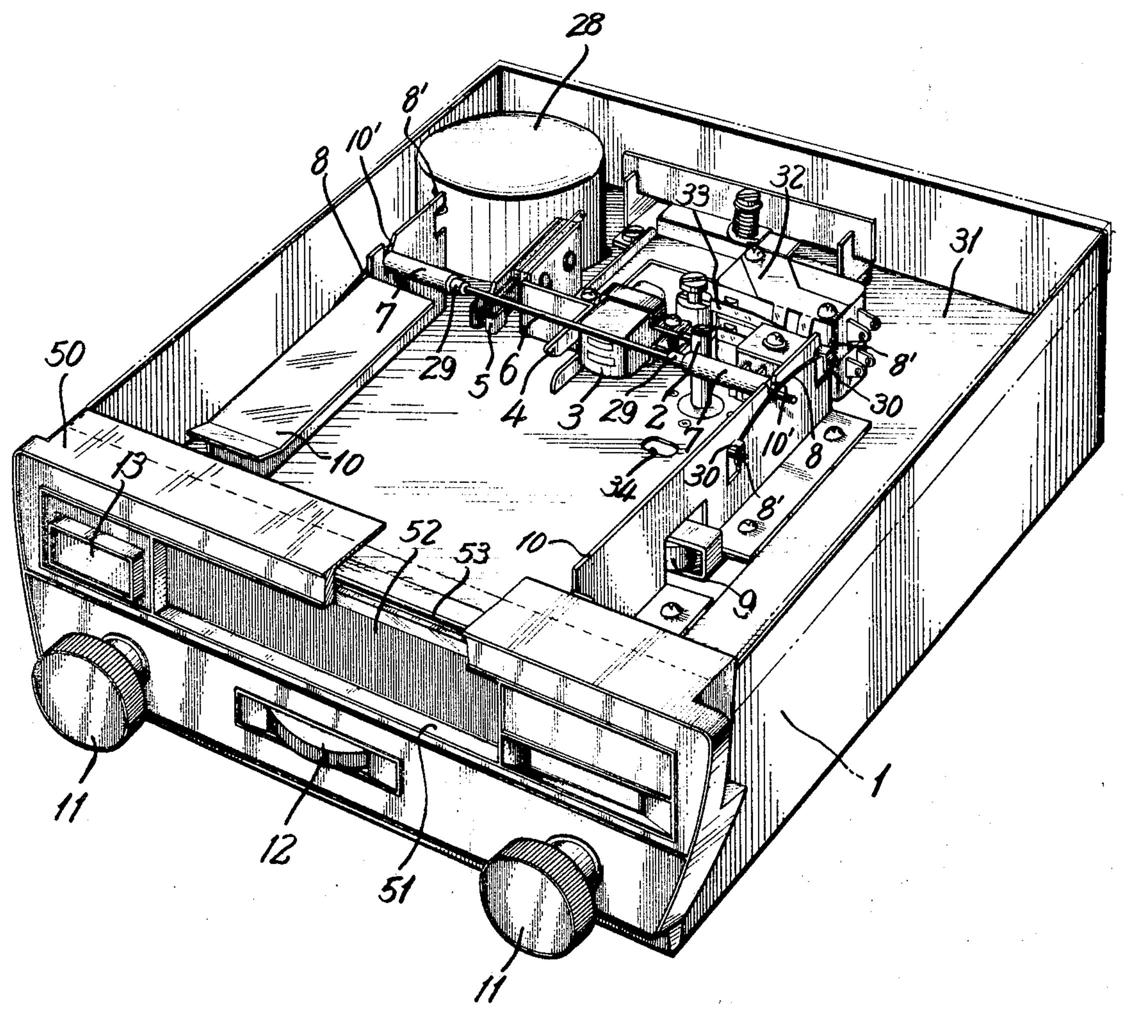
FIG. 1 is a perspective view of the tape player according to the present invention, with the top cover plate and a portion of the front decoration frame removed.
Figure 2:
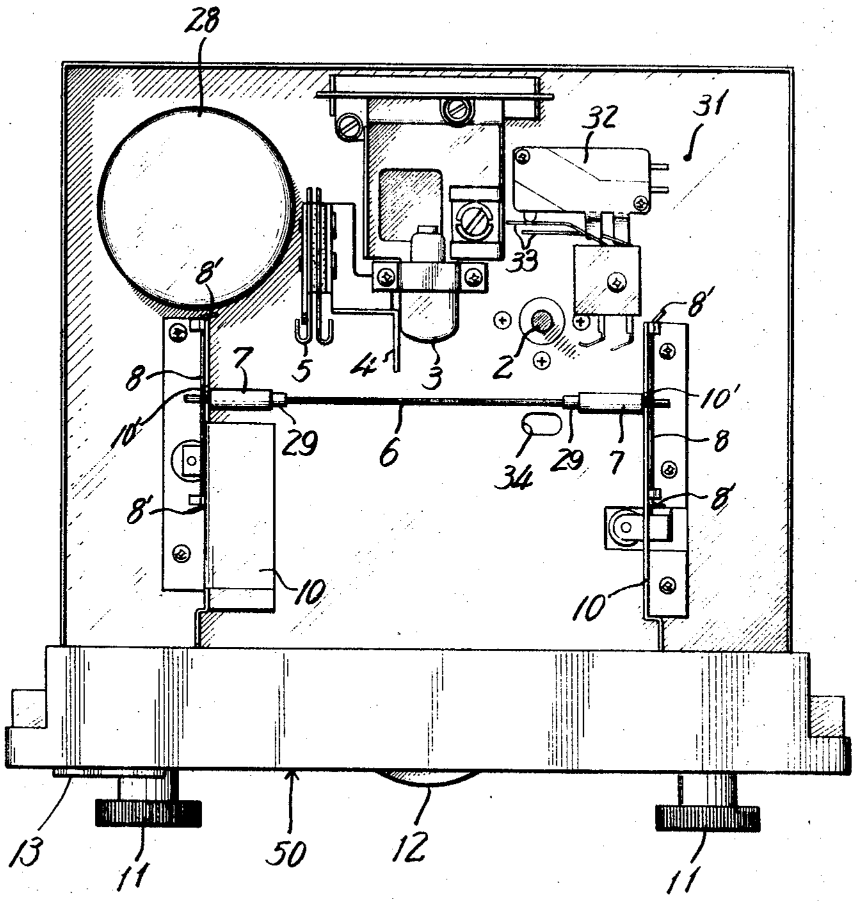
FIG. 2 is a plane view thereof.
Figure 3:
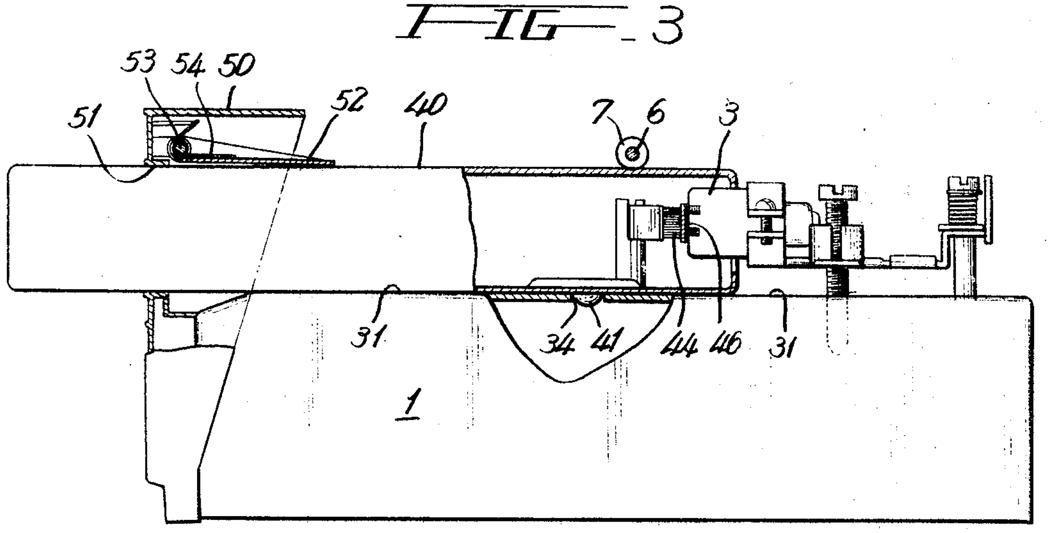
FIG. 3 is a side view partially in section showing the engaging position of the head and the cartridge thereof.

Referring to the attached drawing for explanation of the present invention, guide metals 10, 10 are oppositely arranged on both sides of the base plate 31 of main body 1 of the tape player equipped with the decoration frame 50 at its front, and capstan 2, the recording or playing head 3, tape guide metal 4, detector 5 and the operating piece 33 to the starting switch 32 which are arranged between these guide metals 10, 10 as in the known conventional tape player.

In reference to those elements shown in FIG. 1–FIG. 5, said aforementioned guide metals 10, 10 are longer than those of the conventional ones and extend to both sides of the head 3, with the bearings 10′ respectively provided at the upper edge height of these guide metals 10, 10. Further fitting portions 30, 30 are oppositely arranged at the front and the back of said bearing portions 10′, and the shaft 6 having rotatable synthetic resin or rubber rollers 7, 7 is horizontally arranged between these bearings 10′, 10′. Both ends of the shaft 6 being fixed to the elastic materials 8, 8 such as piano wires which are fixed to said respective fitting portions 30, 30 of the guide metals 10, 10. The shaft 6 is independently fixed with stops 29 to stop the axial movement of rollers 7 and both ends of the elastic materials 8, 8 are suitably bent 8′ so that they cannot get out of each fitting portion 30.

Figure 5:
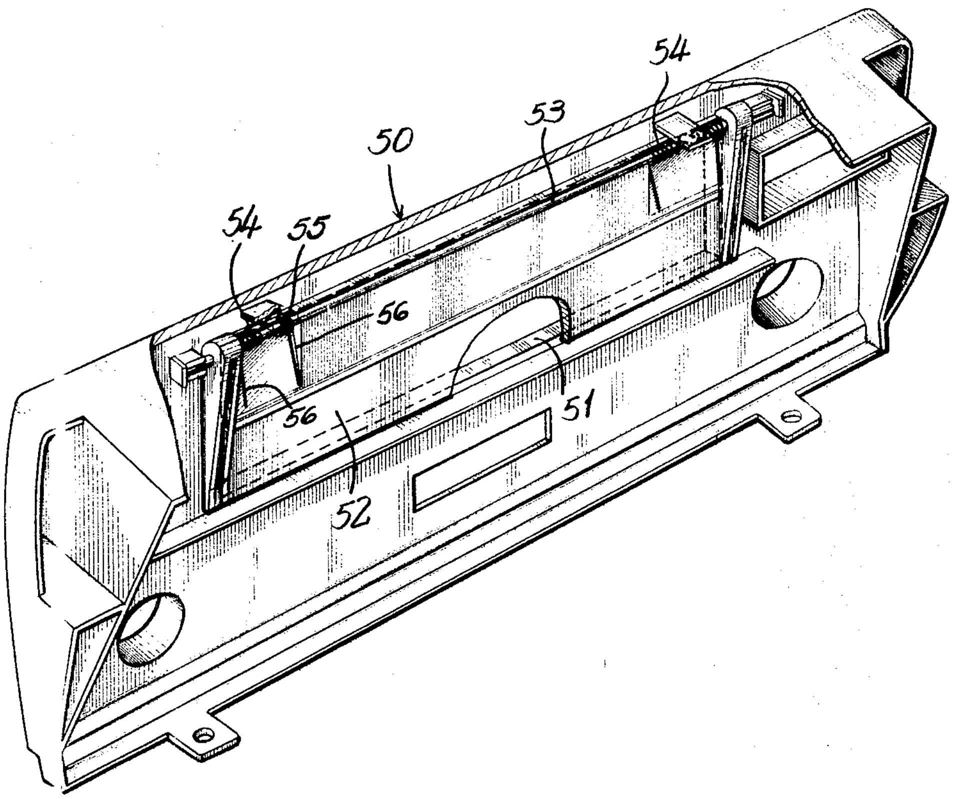
FIG. 5 is a perspective view showing the connection of the door in its decoration frame.

There are positioned the well-known adjusting knobs 11, 11 for volume and tone, operating button 38 for the switching of channels to switch electrically or mechanically or electromechanically the level of said head 3 to the tape on the decoration frame 50 in the front of the tape player. But, in the inserting opening 51 of the tape cartridge 40, as illustrated in FIG. 5, the upper edge of the door 52 is pivoted to the decoration frame 50 by the pivot shaft 53 which is provided with the decoration frame pressing portion 55 at its center, and the spring 54 has both ends formed as the door pressing ends 56, 56 so that the door is always pressed to the inserting opening 51 to keep it closed. The door 52 is formed suitably larger than the inserting opening 51 so that it is fitted to the inserting opening 51 by being pressed to the inside of the inserting opening 51 by means of the elasticity of said spring 54, and the front side of the door 52 is decorated with an ornamental design.

Figure 4:
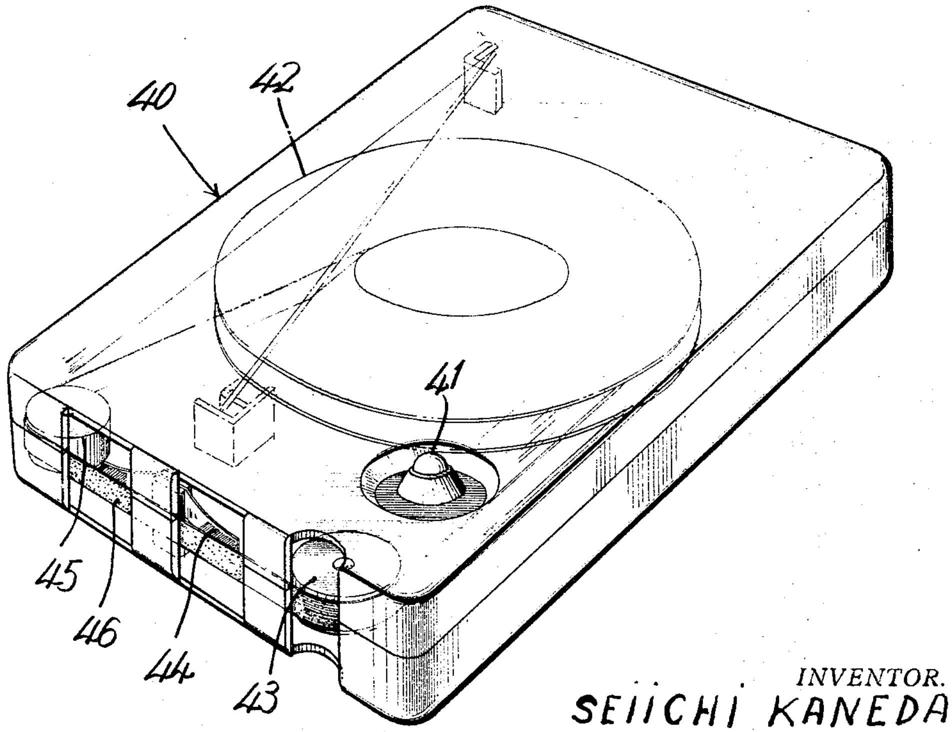
FIG. 4 is a perspective view of the cartridge as viewed from the bottom side.

An oval hole 34 is formed laterally in front of said capstan 2 just below the fitting position of the shaft 6 on said base plate 31. Further as shown in FIG. 4, a suitable elastic material is arranged on the bottom of the cartridge 40 which is to be inserted or removed through the aforementioned inserting opening 51, and the ball-shaped roller 41 is so equipped as to meet the position of said hole 34 at the time of inserting the cartridge. The said roller 41 is suitably pressed in the cartridge 40 by the bed plate 31 when the cartridge is moved between the guide metals 10, 10 and when the cartridge reaches to the position to be inserted this roller projects to mount onto the hole 34. The hole being laterally oblong permits the lateral change in the relation between the cartridge 40 and the head 3, but such a lateral change does not bring about any change between the positions of recording tracks (arranged parallel with the width of the tape) of the tape, but rather it can effectively permit some size errors between the cartridge 40 and the aforementioned arranging parts of the tape player 1. Reel 42 is rotatably arranged in the cartridge 40, and there are respectively provided pinch roller 43, pressing brush 44 and guide roller 45 in front of at the opening. The endless tape 46 wound on the aforementioned reel 42 is withdrawn from the reel 42 and is fed to the front of the aforementioned parts 45, 44, 43, and thereafter it is wound on the outside of the wound tape which is well known. When such a cartridge is inserted in the tape player, the tape 46 is pressedly held between the pinch roller 43 and the capstan 2, and this capstan 2 turns on the starting switch 32 by the completion of insertion of the cartridge 40 to start the electric motor 28. Thus the reel is, at the prescribed speed, rotated to pass the tape 46 before the head 3, pressing it by the pressing brush 44 to make the playing and recording.

To explain the function of the embodiment of the present invention, the shaft 6 having suitable rigidity gives a strong elastic pressure to the head side of the inserted cartridge 40 by means of the elastic materials 8, 8 whose both ends are fixed and thereby the portion facing opposite to the head of the said cartridge 40 can be effectively fixed.

Further, since the shaft 6 is rotatably arranged with the rollers 7 when the end of the cartridge 40 contacts rollers 7, the rollers 7 and the shaft 6 are automatically pushed up to the upper surface of the cartridge 40 by the periphery of the rollers 7, and the cartridge 40 can be smoothly moved by rotating rollers 7. The rollers 41 provided on the bottom of the inserted cartridge 40 projects from the cartridge, but it freely rotates so that the cartridge can be inserted and removed without any resistances. Thus when the cartridge reaches the prescribed inserting position, the roller 41 is correctly fitted in the hole 34 under the pressing function by the shaft 6 and the rollers 7 to keep the prescribed inserting position. In this case, the door 52 presses suitably the side of the inserting opening 51 for cartridge 40 with the elasticity of the spring 54 so that the shaking on account of vibrations of this portion is effectively prevented. Thus suitable inserting relation of the cartridge 40 to the tape player can be always secured.

Figure 6:
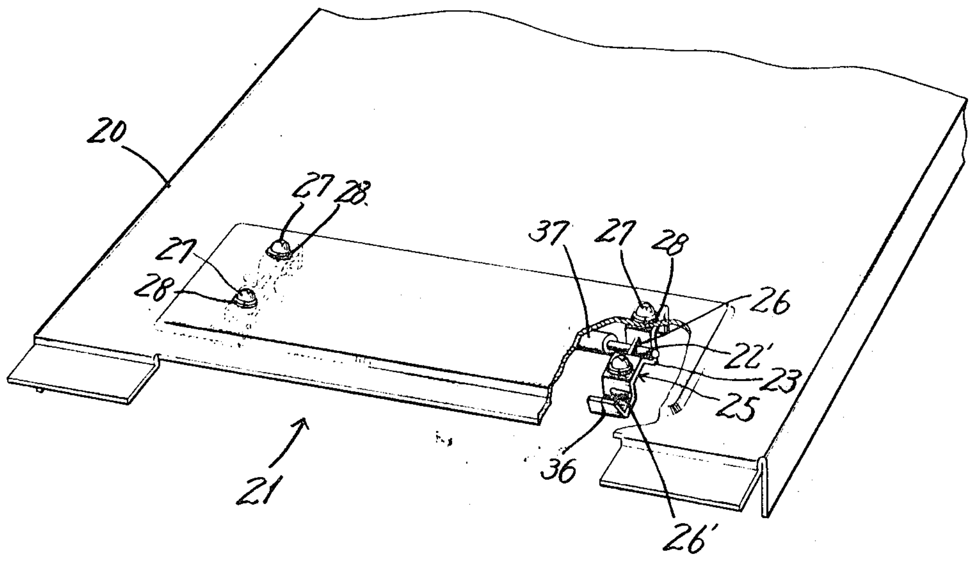
FIG. 6 is a perspective view partly broken away showing a modification of the roller according to the present invention.
Figure 7:
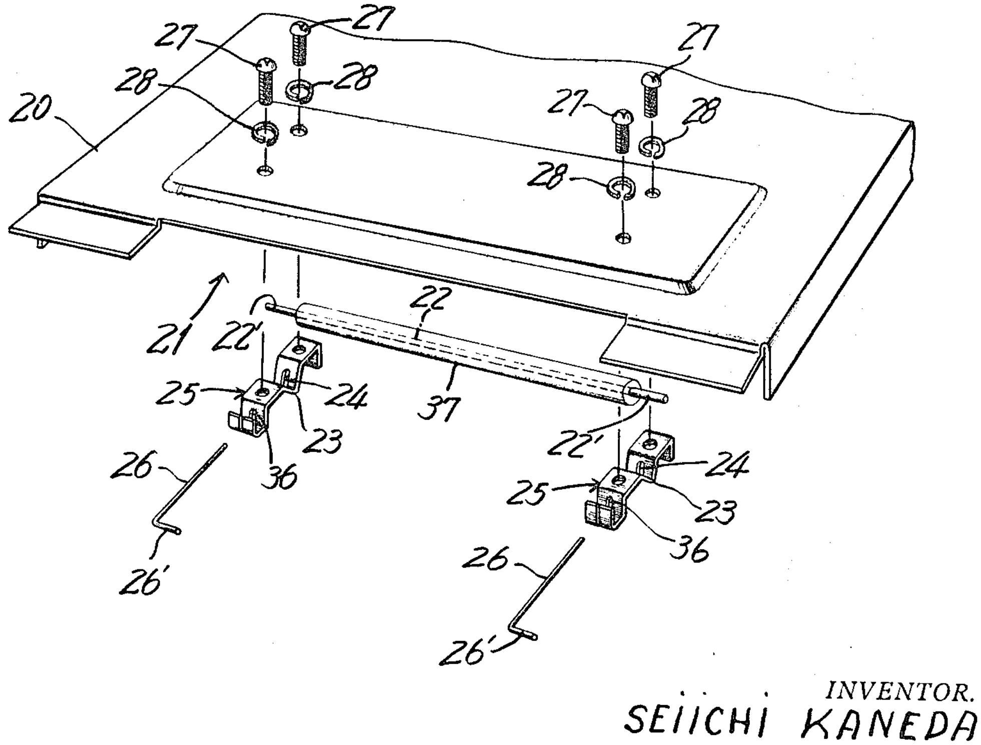
FIG. 7 is an exploded perspective view showing the disassembled condition of the elements of FIG. 6.

Another embodiment of the present invention is shown in FIG. 6 and FIG. 7. In this kind of tape player, the cover plate is in general fitted on the top of the base plate 31 for covering the upper surface of inserting portion of the cartridge, as shown by the chain line in FIG. 1. In the embodiment shown in FIG. 6 and FIG. 7, the same relation as mentioned above is intended to be provided by making good use of such cover plate 20. The opening 21 for inserting and removing the aforementioned cartridge 40 is formed at the back of said inserting opening 51 below the center of the said cover plate 20, and the step metals 25, 25 are oppositely provided which have the V-shaped holding portion 23 at the center thereof through the fitting pieces 27 and a suitable washer 28 in the inside of the cover plate 20. Elastic materials 26 such as piano wire are inserted in the holes 24 provided on such step metals 25, 25 for holding the shaft ends 22′, 22′ of the shaft 22 to which the rollers 37 are rotatably arranged between the aforementioned holding portions 23 and elastic materials 26.

The end of the elastic material 26 is suitably bent 26′ and inserted in the groove 36 which is provided at one of the step metals 25, 25, then after the insertion of the bent portion 26′ into the position near the holding portion 23, the groove 36 is closed by being pressed from both sides, thereby stopping the detachment of the elastic material 26 as shown in FIG. 6. In the embodiment shown in FIG. 6 and FIG. 7, the insertion of the cartridge causes the pressing of the inserted front end by the roller equipped with the elastic material, thereby correctly keeping the relative position of the cartridge and the head lest its relative position is changed by vibrations at the time of running of cars as well as less cross talk is caused. Further, the embodiment shown in FIG. 6 and FIG. 7 can always record and play effectively quite the same as that explained above with reference to FIG. 1–FIG. 5.

What is claimed is:

1. In a tape player having a player main body provided with a base plate, upright side walls extending from said base plate, an inserting and removing opening for a cartridge in one of said side walls, guide members mounted on said base plate defining a cartridge receiving chamber, a rectangular cartridge having an upper and bottom portions connected by side walls, a reel in said cartridge having a magnetically recorded tape therein with a plurality of tracks, a head mounted in said palyer main body capable of being switched to different levels relative to said tape tracks for changing channels and a tape driving member for feeding the tape at fixed speeds in front of said head, a cartridge holder comprising rotary means positioned for pressing the upper front portion of the cartridge at opposite side walls thereof when said cartridge is inserted into said receiving chamber near said head including a rotor shaft extending over the upper portion of the inserted cartridge, elastic materials whose end portions are respectively fixed to said player main body and the central portions of said elastic materials pressing onto said rotor shaft, a door pivotally mounted in the front of the player main body for closing the inserting and removing opening and pivoting inwardly of said player main body upon the insertion of the cartridge through said opening, elastic material tending to press said door onto the upper portion of the inserted cartridge biasing the rear end of the cartridge downward towards said base plate.

References Cited

UNITED STATES PATENTS

| | | | |
|---|---|---|---|
| 3,400,227 | 9/1968 | Lear et al. | 179—100.2 |
| 3,285,526 | 11/1966 | Moore | 179—100.2 |
| 2,867,389 | 1/1959 | Viets | 274—4 |

FOREIGN PATENTS

| | | |
|---|---|---|
| 1,052,044 | 12/1966 | Great Britain. |
| 834,504 | 5/1960 | Great Britain. |
| 966,791 | 8/1957 | Germany. |

LEONARD FORMAN, Primary Examiner

D. A. DEARING, Assistant Examiner

U.S. Cl. X.R.

242—19, 55